Jan. 24, 1967 J. FISHER 3,300,013
MACHINE TOOL SLIDE MEMBER WITH CLUTCH AND STOP
Filed June 1, 1964 3 Sheets-Sheet 2
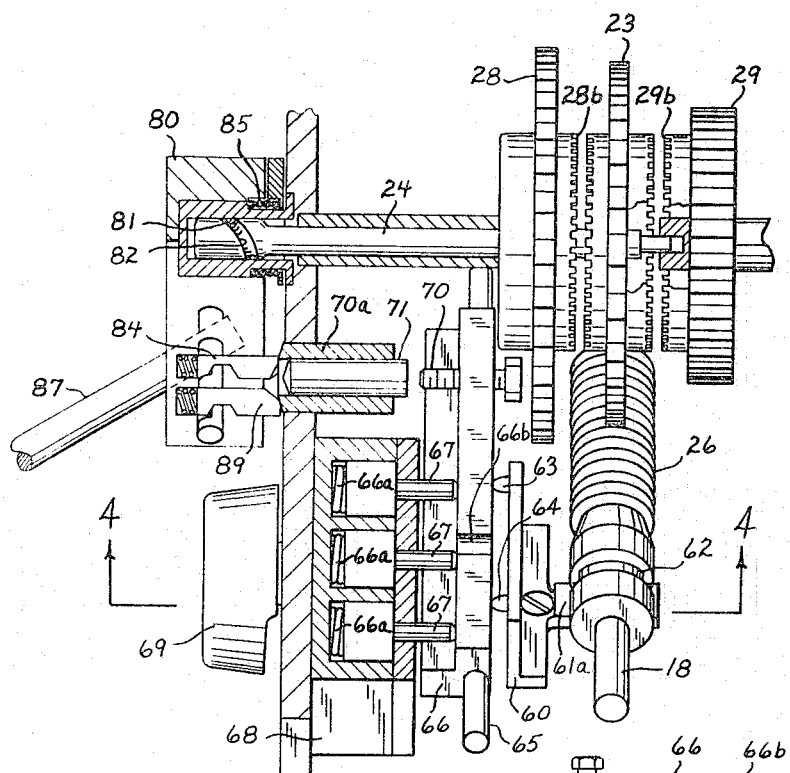
FIG. 3
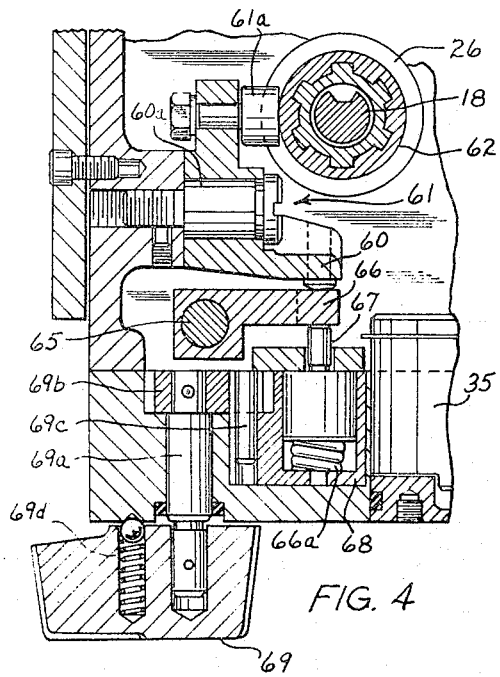
FIG. 4
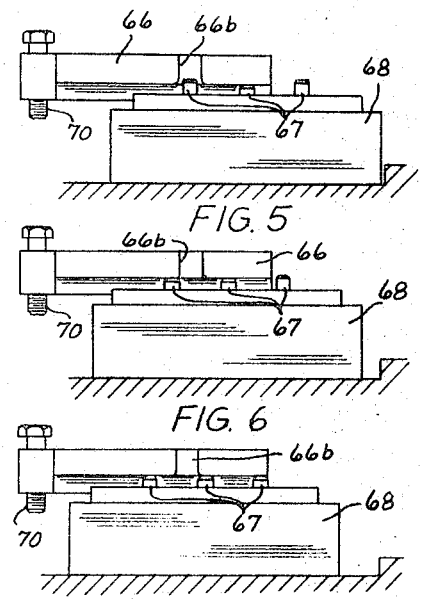
FIG. 5
FIG. 6
FIG. 7
INVENTOR.
JOHN FISHER
BY Williams, David,
Hoffmann & Fount
ATTORNEYS INVENTOR.
JOHN FISHER
BY Williams, David, Hoffmann & Yount
ATTORNEYS

# United States Patent Office 3,300,013
Patented Jan. 24, 1967

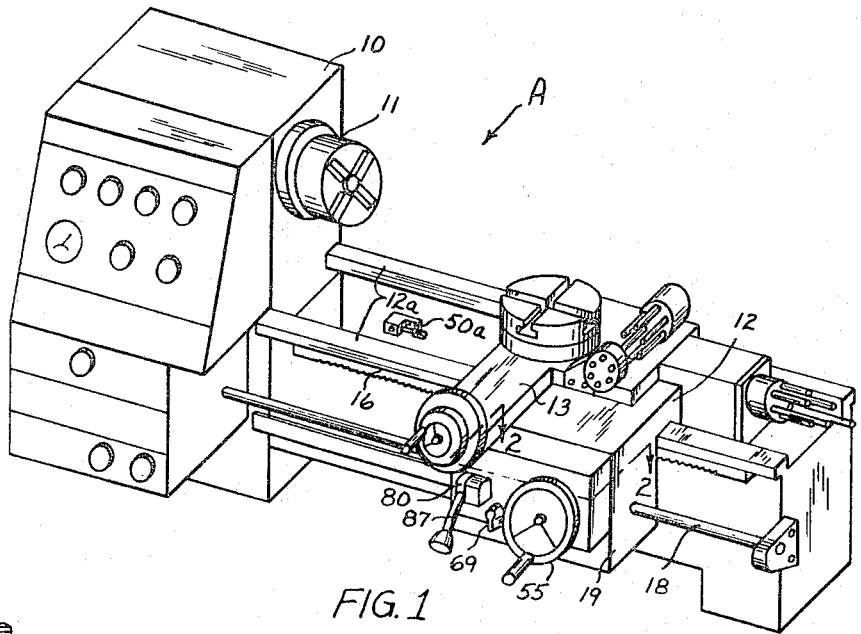

3,300,013
MACHINE TOOL SLIDE MEMBER WITH CLUTCH AND STOP
John Fisher, Aurora, Ohio, assignor to The Warner & Swasey Company, Cleveland, Ohio, a corporation of Ohio
Filed June 1, 1964, Ser. No. 371,527
11 Claims. (Cl. 192—150)

The present invention is directed to a machine tool and, more particularly, to a machine tool in which a drive for positioning a slide against a stop includes a drive disconnect mechanism responsive to the engagement of the slide with the stop to disconnect the drive to the slide.

One of the problems in known machine tools where drive disconnect mechanisms disconnect a drive to a slide when the slide engages a stop is that the drive for the slide "winds up" while the slide is being moved and driven against the stop. Thus, when the drive to the slide is stopped or disconnected in response to engagement with the stop, these "wind-up" forces are released and tend to move the slide away from the stop thereby destroying the accuracy of the positioning of the slide.

Accordingly, the principal object of the present invention is the provision of a new and improved machine tool in which a drive to a slide includes mechanism for preventing the wind-up in the drive from destroying the accuracy of the positioning of the slide when the drive to the slide is disconnected.

Another object of the present invention is the provision of a new and improved machine tool having a drive for positioning a slide against a stop and which includes means for disconnecting the drive when the slide engages the stop, and wherein the drive includes a power transmission device having an input member and an output member and operates to transmit power to the slide, preferably in either direction, and locks the output member against a backlash type of movement due to "unwinding" of forces between the output member and the slide.

A further object of the present invention is the provision of a new and improved machine tool in which a drive for moving a slide against a stop to position the slide is disconnected in response to engagement of the slide with the stop and includes a power transmission device having a driven input member and an output member connected to drive the slide with the input member being drivable in opposite directions to move the slide in opposite directions and with the power transmitting device being so constructed and arranged that the output member is locked against movement due to release of the "wind-up forces" between the output member and the slide upon the stopping of the drive.

Further objects and advantages of the present invention will be apparent from the following detailed description thereof made with reference to the accompanying drawings forming a part of the present specification and in which:

FIG. 1 is a perspective view of a machine tool embodying the present invention;

FIG. 2 is a horizontal cross-sectional view of the machine shown in FIG. 1, taken approximately along the section line 2—2 of FIG. 1;

FIG. 3 is a fragmentary sectional view of the machine of FIG. 1;

FIG. 4 is a sectional view of the apparatus of FIG. 3, taken approximately along the section line 4—4 of FIG. 3;

FIGS. 5, 6 and 7 are fragmentary schematic views illustrating different operative positions of a part of the apparatus of FIG. 1;

Figure 8:
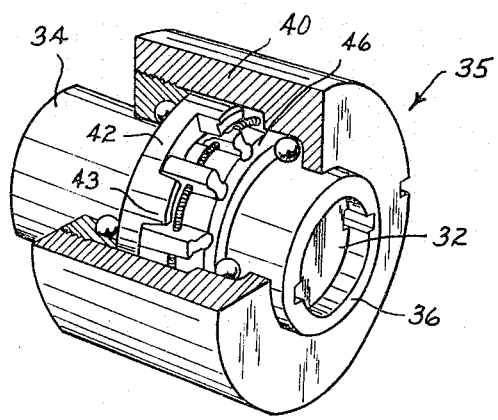
FIG. 8 is a fragmentary perspective view of a portion of the machine of FIG. 1.

The preferred embodiment of the present invention is shown in the drawings which illustrate a machine tool A. The machine tool A includes a headstock 10 having a rotatable spindle 11 and a slide commonly referred to as a cross slide carriage 12 movable toward and away from the spindle 11 on ways 12a extending parallel to the axis of the spindle 11. The cross slide carriage 12 has a cross slide 13 mounted thereon which is adapted to support a tool to perform work on a workpiece supported in the rotatable spindle 11.

The cross slide carriage 12 is moved along the ways 12a upon rotation of a drive member or pinion gear 15 which is adapted to mesh with a rack 16 secured to the bed of the machine adjacent the front ways 12a. The pinion 15 is adapted to be rotated from a drive shaft 18 extending along the front of the bed parallel to the ways 12a and rotatably and slidably received in the apron 19 of the cross slide carriage 12. The shaft 18, as is well known, is continuously rotated while the machine is in operation.

The drive from the shaft 18 to the pinion 15 is controlled by a clutch means 22 (see FIG. 2). The clutch 22 includes an input member 23 rotatably supported by a shaft 24 and supported for limited endwise movement in the apron 19 of the cross slide carriage 12. The input member 23 of the clutch is movable endwise with the shaft 24 and has formed on the periphery thereof a gear 25, which meshes with a worm gear 26 disposed coaxially about the shaft 18 and driven thereby. The endwise movement of the shaft 24 is adapted to connect the input member 23 to an output gear 28 when the shaft 24 is moved endwise in one direction and to an output gear 29 when the shaft 24 is moved endwise in the other direction. The output gears 28, 29 have faces 28a, 29a which respectively confront opposite side faces of the input member 23 and which have teeth 28b, 29b thereon which mate with corresponding teeth on the confronting side of the input member 23 of the clutch to provide a jaw clutch type connection between the input member 23 and the output gears 28, 29 when the member is moved to engage a corresponding one of the gears.

The input member 23 is moved in one direction to drive the cross slide 13, and in the opposite direction to move the cross slide carriage 12 along ways 12a. The input member 23 is moved downwardly, as viewed in FIG. 2, to drive the cross slide 13, and upwardly to drive the carriage 12. When the input member moves downwardly, it engages and drives the output member 28 which turns a screw member 30a which cooperates with a nut member, not shown, to move the cross slide 13 transverse to the spindle axis.

When the input gear 23 moves upwardly, as viewed in FIG. 2, it drives the output gear 29 for driving the carriage 12. The output gear 29 meshes with a gear 30 fixed to a hollow sleeve 31 keyed to drive the input member 34 of a power transmitting device 35 having an output member 36, see FIG. 8, keyed to a shaft 32. The power transmitting device is disposed about the shaft 32 at one end of the sleeve 31 and the shaft 32 extends from the power transmitting device through the sleeve 31 to mount the pinion gear 15. Rotation of the shaft 32 causes the pinion gear 15 to rotate therewith and the cross slide carriage 12 to move along the ways 12a.

The drive for the pinion gear upon operation thereof "winds up," and the power transmitting device 35, upon disconnection of the drive to the shaft 32, as by disconnection or release of the clutch 22, locks the shaft 32 to prevent unwinding thereof. The power transmitting device 35 may be termed a bidirectional one-way power transmitting device since the input member may be rotated in either direction to rotate the output member 36 in either direction and is capable of transmitting power therethrough in one direction only, namely, from the member 34 to the member 36 and locks up to prevent transmission of torque from member 36 to member 34, as will be described hereinbelow.

The bidirectional one-way power transmitting device includes a fixed outer race member 40 supported against rotation in the apron 19 of the cross slide carriage 12. The input member 34 is a sleeve-like member supported for rotation in the outer race 40 and having a flange 42 thereon with portions thereof cut out to provide a plurality of driving lugs 43 extending axially from the flange 42. The output member 36 is supported by the outer race member 40 in coaxial alignment with the flange member 42 and the driving lugs 43 extend axially over the inner portion 46 of the output member 36.

Figure 9:
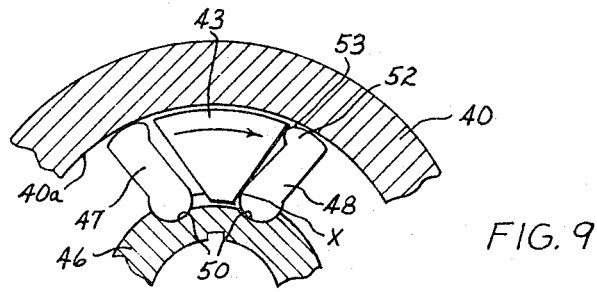
FIGS. 9, 10 and 11 are fragmentary cross-sectional views of the portion of FIG. 8 showing parts thereof in different operative positions.
Figure 10:
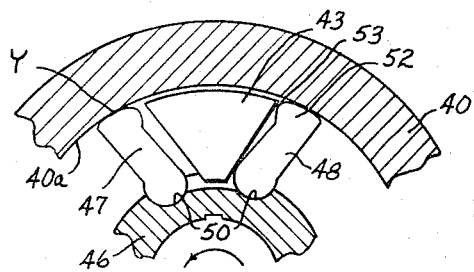
Figure 11:
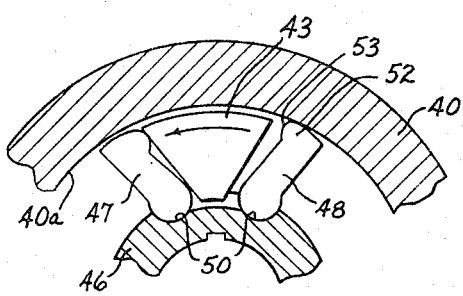

The power transmitting device further includes drive connecting members operatively associated with the input and output members to transmit torque therebetween and to effect the above-noted lock. These members comprise sprags with a sprag located on each side of the driving lugs. The sprags 47, 48 for one of the driving lugs 43 are shown in FIGS. 9–11 and as shown in the drawings, the sprags 47, 48 have rounded bottoms which are received in rounded recesses 50 in the peripheral surface of the inner portions 46 of the output member 36. The sprags 47, 48 are rockable in their recesses 50 about an axis corresponding with the center of the arc defining the surface of the recesses 50. This center lies approximately along the outer periphery of the inner portion 46 of the output member. The inner portion 46 of the output member 36 between the recesses 50 for a given lug is cut away, and the driving lug extends downwardly into the cut-away part so as to be below the outside periphery of the portion 46 of the output member 36 and so that the sides thereof which extend lengthwise along the axis of the output member engage the sprags 47, 48 at a point below the outside periphery of the portion 46 and preferably below the axis of movement of the sprags. The point of engagement has been indicated at X in FIG. 9, and it can be seen that this point is at least on the same radius as the periphery of the portion 46 of the output member 36 on the opposite side of the recess 50 or on a shorter radius.

The sprags also have sides facing the adjacent driving lugs which taper inwardly and terminate in an enlarged rounded outer portion 52, providing a rounded surface 53 for engaging the adjacent side of the cooperating driving lug 43. The described structure of the sprag provides two points of contact between each sprag and the adjacent face of the driving lug 43. The outer peripheral portion 52 of the sprags is curved so that if a sprag is rocked in its recess, it wedges against the internal surface 40a of the outer race member 40. Such a wedging action is illustrated at Y for the sprag 47, in FIG. 10.

If the driving lug 43 is moved against the sprag 48 when it is in its wedging position, the lug 43 first engages the rounded portion 53 of the sprag to rock the sprag about its axis of movement until the sprag is also engaged at the point corresponding to point X. At this time, the rocking movement of the sprag is stopped and power is transmitted from the lugs 43 to the output member 36 through the sprags, with the sprag engaged by the driving lug 43 clearing the surface 40a of the member 40 and the sprag 47 in light contact with the surface 40a. If the drive to the input member 34 and the driving lugs 43 is stopped, the shaft 32 and the output member 36 tend to unwind due to forces which have been wound up by the drive from the member 43 to the slide through the output member 36. If the original drive has taken place in the direction shown in FIG. 9, the backlash or unwinding movement of the output member 36 will take place in the direction indicated in FIG. 10. This backlash or unwinding movement of the output member 36 causes the sprag 47 to be rocked about its axis toward the driving lug 43 so that the outer peripheral surface will wedge as indicated at point Y. Thus, after a slight amount of unwinding movement of the output member 36, the sprag is effective to lock the output member 36 from further unwinding movement. The sprags are joined by a spring member which, when the sprags are not engaged by a driving lug, tends to keep the sprags in light contact with the inner surface 40a of the outer race, as shown in FIG. 9, for the sprag 47. Thus, when the backlash occurs in the output member 36, the sprag which is not being driven will quickly wedge against the fixed outer race surface 40a.

The input member 34 may be driven in opposite directions to drive the pinion 15 so as to move the carriage 12 toward or away from the spindle 11. FIG. 11 illustrates the position of the sprags 47, 48 when the input member 34 is driven in the opposite direction to that of FIG. 9. In this position, the drive to the output member 36 is through the sprag 47. When the drive to the input member through clutch 22 is disconnected, the sprag 48 wedges in the same manner as described above in relation to the sprag 47 if backlash should occur.

The machine tool A also includes a handwheel drive for manually rotating the pinion 15 for moving the carriage 12 toward or away from the spindle 11. The handwheel drive includes a handwheel member 55 which may be manually gripped and rotated to effect rotation of the pinion 15. The handwheel member 55 is fixedly connected to a shaft member 56 rotatably supported by the carriage 12. The shaft member 56 carries a pinion gear 57 which meshes with the internal gear teeth of a gear member 58 which is fixedly supported on a shaft 59 rotatably supported by the carriage 12. The shaft 59 also carries a gear 59a which meshes with gear 30 carried by sleeve member 31 which is connected to the input member 34 of the power transmitting device 35. It should be apparent from the above that upon rotation of the handwheel 55, the pinion 15 will be rotated through the power transmitting device 35 as described above and the power transmitting device will operate to prevent any unwinding movement from destroying the accuracy of the positioning of the carriage 12, as described above.

The means for disconnecting the drive to the carriage 12 and specifically to the input member 34 of the mechanism 35 may take any form and functions, in the preferred embodiment, to disconnect the clutch 22 when the slide is driven against a stop 50a and is substantially the same as that shown in United States Patent No. 3,120,133, issued to the assignee of the present application. When the carriage 12 engages the stop 50a the worm 26 moves axially along the shaft 18 in response to the overload condition in a manner described in more detail in the aforesaid patent. The axial movement of the worm 26 causes the rocking of a pivoted plate 60 in a direction dependent upon the direction of movement of the worm 26 which moves in a direction dependent on the direction of the drive. The plate 60 is connected to be actuated from the worm 26 by reason of the yoke-type connection 61 including a follower member 61a which rides in an annular groove 62 formed in a member fixed to one end of the worm 26. The follower 61a is supported by the plate member 60 which, in turn, is rotatably supported by a pin member 60a supported by the carriage 12. When the worm 26 moves axially on the shaft 18, the follower 61a moves therewith and effects pivoting of the plate member 60 about its axis provided by the pin 60a. When the member 60 is pivoted about its axis, one of a pair of pins 63, 64 fixed to the plate 60 effects movement of a knock-off member 66 about the axis of a shaft 65 which supports the knock-off member 66. The pins 63, 64 are disposed on opposite sides of the axis of rocking movement of the plate member 60, and the pins 63, 64 engage the knock-off member 66 on one side of the axis of the shaft 65. Consequently, when the member 60 is rocked about its axis regardless of the direction of movement, one of the pins 63, 64 will cause the knock-off member 66 to be rocked about the axis of the shaft 65 against a spring bias which urges the knock-off member 66 into engagement with the pins 63, 64.

The spring bias against which the knock-off member 66 moves is provided by a plurality of spring members 66a which bias separate plungers 67 into engagement with the knock-off member 66. The springs 66a and the plungers 67 are supported in a block member 68 which is slidable in the carriage 12 with respect to the knock-off member 66. The block 68 has three positions, in the preferred embodiment, wherein different spring forces act against movement of the knock-off member 66, thereby requiring different forces to effect movement of the knock-off member. The different positions of the block 68 with respect to the knock-off member 66 are illustrated in FIGS. 5, 6 and 7.

FIG. 5 illustrates only one of the spring members 66a acting against the knock-off member 66. In the position shown in FIG. 5, the block 68 is positioned with respect to the knock-off member 66 so that the middle plunger 67, as shown in the drawings, engages the knock-off member 66 and the spring associated therewith resists movement thereof. The other plungers are positioned so that they do not engage the knock-off member 66. Upon viewing FIG. 5, it should be apparent that one of the plungers, namely, the plunger farthest to the left, is positioned in alignment with an opening 66b in the knock-off member 66 and, therefore, does not engage the member 66 but rather is received in the opening 66b. In FIG. 6, the block 68 has been moved to the left from the position shown in FIG. 5 to a position wherein two of the plungers 67 act against the knock-off member 66, and the position shown in FIG. 7 is a further position of the block 68 wherein all three of the plungers 67 engage the knock-off member 66 to resist movement thereof.

The block member 68 and the springs 66a and plungers 67 are bodily moved between the various positions shown in FIGS. 5–7 by a manually operated positioning mechanism including a handle 69 which is operatively connected with a shaft 69a which, in turn, carries a gear 69b. The gear 69b engages a pin member 69c carried by the block 68. Upon rotation of the handle 69, the gear 69b will effect movement of the block by applying a force to the pin member 69c to effect movement thereof. A suitable detent mechanism 69d is carried by the handle 69 in order to provide the three proper positions of the handle 69 corresponding with the positions of the block 68 shown in FIGS. 5, 6 and 7.

The knock-off member 66 which moves against the spring bias supports an adjustable screw 70 which is adapted to engage a pin 71 supported for axial movement in a sleeve 70a fixed in the apron of the carriage 12. The screw 70 causes the pin 71 to be projected to release a plunger whose outer end had been received in the end of the sleeve 70a to lock the clutch 22 in an engaged position. The clutch 22 is moved to an engaged position by rotating a control member 80, see FIG. 3, journaled on the outer end of the shaft 24 projecting forwardly from the apron 19. When the control member 80 is rotated, a pin 81 which rotates with the member 80 and which is received in a cam groove 82 formed in the outer end of the shaft 24 will cause the shaft 24 to shift endwise to engage either the output gear 28 or the output gear 29 depending upon the direction of rotation of the control member 80.

When the control member 80 is moved in one direction to engage the clutch, a plunger 84 disposed in the lower end of a block member 80 is received in the end of the sleeve 70a supported in the apron to hold the control member in its actuated position against the bias of torsion spring means 85 disposed about a portion of the control member coaxially with the shaft 24 and tending to return the control member 80 to a neutral position. When the plunger 84 is received in the end of the sleeve 70a, the clutch is held or maintained engaged. In a similar manner, if the control member 80 is rocked in the other direction from its neutral position, a control member plunger 89 is received in the opening in the end of the sleeve 70a to hold the clutch in its other engaged position. The clutch can be released by operating a handle 87 which rotates a shaft that has a dog thereon for withdrawing the plungers 84, 89 from the sleeve 70a.

As the cross slide carriage moves, with the clutch 22 engaged so that gear 23 engages gear 29, the carriage 12 will move against the stop 50a causing a build-up of torque and a shifting of the worm 26 which, in turn, causes the plunger 71 to be projected to cause the release of the plunger 84 or the plunger 89 from the end of the sleeve 70a to allow the torsion spring 85 to return the control member 80 to its neutral position and to disengage the clutch 22. As hereinbefore described, upon disengagement of the clutch 22, no backlash will occur at the shaft 32 to destroy the accuracy of the positioning of the cross slide carriage. In this respect, it should be noted that the lost motion movement of the input lugs 43 between their position for driving the sprags in one direction and their position for driving the sprags in the opposite direction also allows the wind-up between the clutch 22 and the input member of the power transmission device 35 to be released without effecting a drive between the input member 34 and the output member 36. Moreover, this lost motion movement enables the wind-up between the clutch 22 and the input member 34 to be released without releasing the wedging action of the sprags holding the output member 36 from rotation.

When the clutch 22 is engaged so that the gear 23 engages a gear 28, the cross slide 13 is moved. The cross slide 13 moves between predetermined limits provided by stops. When the cross slide 13 engages a stop, the worm 26 again is moved axially effecting disengagement of the clutch 22, as described above in connection with slide 13.

From the foregoing, it can now be seen that the present invention provides a new and improved machine tool in which a slide member may be driven against a stop and locked into position against the stop by the action of a power transmission device which is a part of the drive to the slide. Moreover, while the preferred embodiment of the present invention has been described above in considerable detail, certain changes, modifications, and adaptations may be made therein by those skilled in the art and it is intended to cover all such changes, modifications, and adapations falling within the appended claims.

What I claim is:

1. In a machine tool, a slide member movable between predetermined positions, a rotatable drive member operatively connected with said slide member to effect movement of said slide member upon rotation thereof, a one-way power transmitting mechanism having a rotatable input member and a rotatable output member operatively connected to said drive member to rotate said drive member on rotation of said input member and operable to lock said output member against rotation to drive said input member, and drive means for driving said input member and including disconnect means operable to disconnect said drive means to said input member, said drive means comprises a clutch biased to a disengaged position and latch means for holding said clutch against said bias in an engaged position for transmitting power therethrough and said disconnect means comprises a knockoff member operatively associated with said latch means and movable to release said latch means.

2. In a machine tool, a slide member movable between predetermined positions, a rotatable drive member operatively connected with said slide member to effect movement of said slide member upon rotation thereof, a one-way power transmitting mechanism having a rotatable input member and a rotatable output member operatively connected to said drive member to rotate said drive member and means for transmitting power to said output member on rotation of said input member and operable to lock said output member against rotation to drive said input member, and drive means for driving said input member and including disconnect means operable to disconnect said drive means to said input member, said drive means comprises a clutch biased to a disengaged position and latch means for holding said clutch against said bias in an engaged position for transmitting power therethrough and said disconnect means comprises a knockoff member operatively associated with said latch means and movable to release said latch means, said means further including a plurality of springs, support means supporting said springs adjacent said knock-off member and movable to bodily move said springs relative to said knock-off member, said springs when moved relative to said knock-off member applying a biasing force to said knock-off member resisting movement of said knock-off member with the number of springs acting against movement of the knock-off member dependent upon the extent of movement of said support means, and means for moving said support means.

3. In a machine tool, a slide member movable between predetermined positions, a rotatable drive member operatively connected with said slide member to effect movement of said slide member upon rotation thereof, a one-way power transmitting mechanism having a rotatable input member and a rotatable output member operatively connected to said drive member to rotate said drive member and means for transmitting power to said output member on rotation of said input member and operable to lock said output member against rotation to drive said input member, and drive means for driving said input member and including disconnect means operable to disconnect said drive means to said input member, said drive means comprises a clutch biased to a disengaged position and latch means for holding said clutch against said bias in an engaged position for transmitting power therethrough and said disconnect means comprises a knock-off member operatively associated with said latch means and movable to release said latch means, said means further including a plurality of springs, support means supporting said springs adjacent said knock-off member and movable to bodily move said springs relative to said knock-off member, said springs when moved relative to said knock-off member applying a biasing force to said knock-off member resisting movement of said knock-off member with the number of springs acting against movement of the knock-off member dependent upon the extent of movement of said support means, and means for moving said support means, said support means comprises a boxlike structure containing said plurality of springs with each of said springs being spaced from other springs.

4. In a machine tool, a slide member movable against a stop, a drive member operatively connected with the slide member to effect movement thereof upon rotation of said drive member, a one-way power transmitting mechanism having an input member and an output member, first drive means connecting said output member to said drive member and winding up in response to said slide engaging said stop, second drive means for driving said input member and disconnectable to render the drive to said input member ineffective, means for disconnecting said second drive means after said slide engages said stop, and said one-way power transmitting mechanism having means interconnecting said input and output members to transmit torque from the input to the output member and lock said output member from moving due to unwinding of said first drive means, said means further including a handwheel, drive means connecting said handwheel to drive said input member upon rotation of said handwheel.

5. In a machine tool, a slide member movable against a stop, a drive member operatively connected with the slide member to effect movement thereof upon rotation of said drive member, a one-way power transmitting mechanism having an input member and an output member, first drive means connecting said output member to said drive member and winding up in response to said slide engaging said stop, second drive means for driving said input member and disconnectable to render the drive to said input member ineffective, means for disconnecting said second drive means after said slide engages said stop, and said one-way power transmitting mechanism having means interconnecting said input and output members to transmit torque from the input to the output member and lock said output member from moving due to unwinding of said first drive means, said second drive means comprises a clutch biased to a disengaged position and latch means for holding said clutch against said bias in an engaged position for transmitting power therethrough and said disconnect means comprises a knockoff member operatively associated with said latch means and movable to release said latch means.

6. A machine tool comprising a stop, a slide member movable to a predetermined position against said stop, a drive member operatively connected with said slide member and driven to effect movement of said slide member, a one-way power transmitting mechanism having an output member rotatably fixed to said drive member and an input member and means for transmitting power to said output member on rotation of said input member, means for transmitting drive to said input member including power responsive means for disconnecting the drive to said input member in response to an overload, said one-way power transmitting mechanism further including means for locking said output member against rotation in response to said slide member abutting said stop to maintain the slide in engagement with the stop.

7. A machine tool as defined in claim 6 wherein said input member has lost motion movement relative to said output member between first and second positions for driving in opposite directions, and means engaged by said input member when in its respective drive positions for transmitting motion to said output member on rotation of said input member in one direction and for locking said output member against movement when said input member is in its other driving position and said output member is rotated in said one direction.

8. A machine tool as defined in claim 7 wherein said means engaged by said input member comprises wedge elements disposed on opposite sides of a part of said input member and connected to said output member for limited movement relative thereto, said part of said input member being engageable with said wedge elements to effect a release thereof and a driving of said output member.

9. A machine tool comprising a stop, a slide member movable against said stop, a drive member operatively connected with the slide member to effect movement thereof upon rotation of said drive member, a one-way power transmitting mechanism having an input member and an output member, first drive means connecting said output member to said drive member and winding up in response to said slide engaging said stop, second drive means for driving said input member and disconnectable to render the drive to said input member ineffective, means for disconnecting said second drive means after said slide engages said stop, and said one-way power transmitting mechanism having means interconnecting said input and output members to transmit torque from the input to the output member and lock said output member from moving due to unwinding of said first drive means.

10. A machine tool as defined in claim 9 wherein said one-way power transmitting mechanism includes a housing member fixed to said slide and said means for transmitting power to said output member from said input member comprises wedge members operable to wedge between said output member and said housing member to lock said output and housing members together.

11. A machine tool as defined in claim 10 wherein said wedge members are rockable relative to said input member between a drive position and a wedging position.

References Cited by the Examiner

UNITED STATES PATENTS

| | | | |
|---|---|---|---|
| 2,560,238 | 7/1951 | Nouzak | 192—143 |
| 2,614,672 | 10/1952 | Lannder | 192—150 |
| 2,888,843 | 6/1959 | Hollis | 192—8 |
| 3,119,479 | 1/1964 | Lund | 192—8 |
| 3,120,133 | 2/1964 | Diener et al. | 74—411 |
| 3,190,588 | 6/1965 | Pisano | 192—8 |
| 3,200,916 | 8/1965 | Rasmussen | 192—8 |

DAVID J. WILLIAMOWSKY, *Primary Examiner.*